US010324729B2

(12) United States Patent
Roy et al.

(10) Patent No.: US 10,324,729 B2
(45) Date of Patent: Jun. 18, 2019

(54) MACHINE INTELLIGENCE AND LEARNING FOR GRAPHIC CHIP ACCESSIBILITY AND EXECUTION

(71) Applicant: The Charles Stark Draper Laboratory, Inc., Cambridge, MA (US)

(72) Inventors: Nilay K. Roy, Newton, MA (US); Rami S. Mangoubi, Newton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/691,970

(22) Filed: Aug. 31, 2017

(65) Prior Publication Data
US 2018/0341493 A1 Nov. 29, 2018

Related U.S. Application Data

(60) Provisional application No. 62/511,432, filed on May 26, 2017.

(51) Int. Cl.
G06F 9/38 (2018.01)
G06F 9/44 (2018.01)
(Continued)

(52) U.S. Cl.
CPC ............ G06F 9/3881 (2013.01); G06F 8/311 (2013.01); G06F 8/451 (2013.01); G06F 15/167 (2013.01); G06N 3/02 (2013.01); G06N 20/00 (2019.01)

(58) Field of Classification Search
CPC ...................................................... G06F 13/10
USPC ........................................................ 717/146
See application file for complete search history.

(56) References Cited

U.S. PATENT DOCUMENTS 7,444,637 B2 * 10/2008 Pronovost ............. G06F 9/4881
711/151
8,935,682 B2 1/2015 Stefansson et al.
(Continued)

FOREIGN PATENT DOCUMENTS

WO 2018217222 A1 11/2018

OTHER PUBLICATIONS

Mishra et al., Architecture Description Language Driven Design Space Exploration in the Presence of Coprocessors, 2001.*
(Continued)

Primary Examiner — John Q Chavis
(74) Attorney, Agent, or Firm — Hamilton, Brook, Smith & Reynolds, P.C.

(57) ABSTRACT

Methods and systems enabling rapid application development, verification, and deployment requiring only knowledge of high level languages. Two aspects of the disclosed methods and systems are called Machine Intelligence and Learning for Graphic chip Accessibility (MILeGrA) and Machine Intelligence and Learning for Graphic chip Execution (MILeGrE). Using MILeGrA and MILeGrE, high-level language programmers do not need to learn complex coprocessor programming languages, but can still use coprocessors (e.g., GPU processors) to benefit from results-in-seconds big data capabilities through the translation of coprocessor-unaware code to coprocessor-aware code. Execution of such coprocessor-unaware code on coprocessors includes parsing the coprocessor-unaware code to generate intermediate code, analyzing the intermediate code to determine a model for coprocessor-aware code generation, and generating coprocessor-aware code based on the model using machine learning techniques.

25 Claims, 12 Drawing Sheets

(51) Int. Cl.
  *G06F 15/167* (2006.01)
  *G06F 8/30* (2018.01)
  *G06F 8/41* (2018.01)
  *G06N 3/02* (2006.01)
  *G06N 20/00* (2019.01)

(56) References Cited

U.S. PATENT DOCUMENTS

| | | | |
|---|---|---|---|
| 8,949,807 B2 | 2/2015 | Stefansson et al. | |
| 9,280,382 B1 | 3/2016 | Stefansson | |
| 2003/0023831 A1* | 1/2003 | Deveruex | G06F 9/3877 712/34 |
| 2004/0187135 A1* | 9/2004 | Pronovost | G06F 9/4881 718/104 |
| 2004/0250045 A1* | 12/2004 | Dowling | G06F 9/3842 712/10 |
| 2014/0032878 A1* | 1/2014 | Dowling | G06F 9/3842 712/18 |

OTHER PUBLICATIONS

Vitay, et al., "ANNarchy: a code generation approach to neural simulations on parallel hardware", Frontiers in Neuroinformatics, www.frontiersin.org, Jul. 2015, vol. 9, Article 19.

Ashouri, et al., "COBAYN: Compiler Autotuning Framework Using Bayesian Networks," ACM Transactions on Architecture and Code Optimization, vol. 13, No. 2, Article 21, 25 pages (Jun. 2016).

Falch, et al. "Machine learning-based auto-tuning for enhanced performance portability of OpenCL applications," John Wiley & Sons, Ltd., 20 pages, (2016).

Invitation to Pay Additional Fees dated Feb. 27, 2018 for Application No. PCT/US2017/049602, entitled "Machine Intelligence and Learning for Graphic Chip Accessibility and Execution".

Kofler, et al., "An Automatic Input-Sensitive Approach for Heterogeneous Task Partitioning," Proceedings of the 27th International ACM Conference on International Conference on Supercomputing, ICS '13, pp. 149-160 (2013).

Wang, et al. "Automatic and Portable Mapping of Data Parrallel Programs to OpenCL for GPU-Based Heterogeneous Systems," ACM Transactions on Architecture and Code Optimization, vol. 11, No. 4, Article 42, 26 pages (Dec. 2014).

NVIDIA Tesla P100, GP100 Pascal Whitepaper, "The Most Advanced Datacenter Accelerator Ever Built Featuring Pascal GP100, the World's Fastest GPU", WP-08019-001_v01.1, 45 pages, 2016.

* cited by examiner

```xml
<?xml version="1.0"?>
<milegra>
 <machine id=1>
  <cpu id="1">
    <type>intel</type>
    <type-1>xeon</type-1>
    <type-2>v5</type-2>
    <type-3>e5-1585</type-3>
  </cpu>
  <cpu id="2">
    <type>intel</type>
    <type-1>xeon</type-1>
    <type-2>v5</type-2>
    <type-3>e5-1585</type-3>
  </cpu>
  <mem id="1">
    <mtype>GDDR5</mtype>
    <mtype-1>256GB</mtype-1>
    <mtype-2>3.6Gbit/s</mtype-2>
    <mtype-3>900HZ</mtype-3>
  </mem>
  <network id="1">
    <ntype>1G</ntype>
    <ntype-1>MTU1500</ntype-1>
    <ntype-2>255.255.255.0</ntype-2>
    <ntype-3>10.0.23.5</ntype-3>
    <ntype-4>dhcp-no</ntype-4>
    <ntype-5>wired</ntype-5>
    <ntype-6>ping-yes</ntype-6>
    <ntype-7>tcp</ntype-7>
    <ntype-8>vlan-no</ntype-8>
    <ntype-9>NA</ntype-9>
    <ntype-10>NA</ntype-10>
    <ntype-11>NA</ntype-11>
    <ntype-12>NA</ntype-12>
  </network>
  <GPU id="1">
    <gtype>nvidia</gtype>
    <gtype-1>tesla</gtype-1>
    <gtype-2>k80m</gtype-2>
    <gtype-3>pcie</gtype-3>
    <gtype-4>passive</gtype-4>
    <gtype-5>cuda8</gtype-5>
    <gtype-6>opencl22</gtype-6>
    <gtype-7>NA</gtype-7>
  </GPU>
  <GPU id="2">
    <gtype>nvidia</gtype>
    <gtype-1>tesla</gtype-1>
    <gtype-2>k80m</gtype-2>
    <gtype-3>pcie</gtype-3>
    <gtype-4>passive</gtype-4>
    <gtype-5>cuda8</gtype-5>
    <gtype-6>opencl22</gtype-6>
    <gtype-7>NA</gtype-7>
  </GPU>
  <APU id="1">
    <atype>NONE</atype>
  </APU>
  <FPGA id="1">
    <ftype>NONE</atype>
  </FPGA>
  <OS id="1">
    <otype>Linux</otype>
    <otype-1>x86_84</otype-1>
    <otype-2>centos</otype-2>
    <otype-3>7_3_1611</otype-3>
    <otype-4>NA</otype-4>
  </OS>
  ::::::OTHER ATTRIBTUES for PCIe, USB, WIRELESS, BLUETOOTH, METRICS for each machine:::::
 </machine>
</milegra>
```

Fig. 4

MACHINE INTELLIGENCE AND LEARNING FOR GRAPHIC CHIP ACCESSIBILITY AND EXECUTION

RELATED APPLICATION

This application claims the benefit of U.S. Provisional Application No. 62/511,432, filed on May 26, 2017. The entire teachings of the above application are incorporated herein by reference.

BACKGROUND

Many algorithm designers do not know how to program using languages supporting parallel coprocessors, such as OpenCL, but these designers are able to use high-level, coprocessor-unaware programming languages, such as Matlab. Applications written in such programming languages can takes hours to execute. Such designers would, instead, prefer to achieve results in seconds. To accomplish this, designers currently need to seek help from experts in graphics processing unit (GPU) or field programmable gate array (FPGA) languages. The designers provide the experts with the coprocessor-unaware code (e.g., Matlab code), and the experts expend many person-hours to implement algorithms that can take advantage of parallel coprocessors. For any subsequent modifications to the algorithms, the designers would again need the help of the specialized programmers.

SUMMARY

The disclosed methods and systems solve this problem, enabling rapid application development, verification, and deployment that requires no more than knowledge of high-level languages by translating coprocessor-unaware code to coprocessor-aware code. One example embodiment is a method of enabling execution of coprocessor-unaware computer code on coprocessors. The example method includes parsing coprocessor-unaware computer code to generate intermediate code. The intermediate code is analyzed to determine a model for coprocessor-aware computer code generation, and coprocessor-aware computer code is generated based on the model using machine learning.

Another example embodiment is a system for executing coprocessor-unaware computer code on coprocessors. The example system includes a device network having coprocessors, source code written in a coprocessor-unaware computer code, and a coprocessor-aware computer code generation program. The coprocessor-aware computer code generation program is configured to (i) parse the source code to generate intermediate code, (ii) analyze the intermediate code to determine a model for coprocessor-aware computer code generation, (iii) generate coprocessor-aware computer code based on the model using machine learning; and (iv) execute the coprocessor-aware computer code using the coprocessors.

Another example embodiment is a machine-readable storage medium having stored thereon a computer program for enabling execution of coprocessor-unaware computer code on coprocessors. The computer program includes a routine of set instructions for causing the machine to parse coprocessor-unaware computer code to generate intermediate code, analyze the intermediate code to determine a model for coprocessor-aware computer code generation, and generate coprocessor-aware computer code based on the model using machine learning.

The coprocessor-unaware computer code can include non-parallel computer code, and the coprocessor-aware computer code can include parallel computer code. Generating coprocessor-aware computer code using machine learning can include using a neural network, which can be trained using samples of intermediate code and corresponding coprocessor-aware computer code. The coprocessors can be, for example, graphic processing units, field programmable gate arrays, accelerated processing units, or security layer processors.

The coprocessor-unaware computer code type can be any of, for example, Matlab, Julia, and Python programming languages, and the coprocessor-aware computer code type can be, for example, an OpenCL programming language. Analyzing the intermediate code can include determining a model for coprocessor-aware computer code generation based on training data including samples of intermediate code and corresponding models. Analyzing the intermediate code can also include determining a numerical method, and the coprocessor-aware computer code can be generated based on the model and the numerical method.

Some embodiments can include compiling the coprocessor-aware computer code, testing link optimizations for the compiled code based on the model to determine optimal execution parameters, and executing the complied code with the optimal execution parameters.

Some embodiments can include, prior to generating the coprocessor-aware computer code, probing physical interfaces to identify coprocessors, loading device drivers corresponding to the coprocessors, obtaining attributes of the coprocessors, and creating a device network representation based on the device drivers and attributes of the coprocessors. In such embodiments, the device drivers can be stored in an elastic database, and the coprocessor-aware computer code can be generated based on the device network representation.

Some embodiments can also check for errors in coding at compile and run time, checking for syntax, inserting break points at parallelization points, and checking for synchronization, race conditions, and scalability. Such embodiments can make changes to the code automatically, generate corresponding correct code, and log results for a user of the system. In addition to generating coprocessor-aware code several validation runs may be performed automatically to test for thread-safety and scalability. For a given problem type, more than one form of coprocessor-aware code may be generated. Then scaling runs may be performed repeatedly to check for thread-safety, scalability, and race-conditions.

Another example embodiment is a method of creating a representation of a device network having coprocessors. The example method includes probing physical interfaces to identify coprocessors, loading device drivers corresponding to the coprocessors, obtaining attributes of the coprocessors, and creating a device network representation based on the device drivers and attributes of the coprocessors.

Another example embodiment is a system for creating a representation of a device network having coprocessors. The example system includes physical interfaces to coprocessors, an elastic database, and a coprocessor discovery program. The coprocessor discovery program is configured to (i) probe the physical interfaces to identify the coprocessors, (ii) load, from the elastic database, device drivers corresponding to the coprocessors, (iii) obtain attributes of the coprocessors, and (iv) create a device network representation based on the device drivers and attributes of the coprocessors.

Another example embodiment is a machine-readable storage medium having stored thereon a computer program for creating a representation of a device network having coprocessors. The computer program includes a routine of set instructions for causing the machine to probe physical interfaces to identify coprocessors, load device drivers corresponding to the coprocessors, obtain attributes of the coprocessors, and create a device network representation based on the device drivers and attributes of the coprocessors.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4 illustrates example data representing a device network.

DETAILED DESCRIPTION

A description of example embodiments follows.

Disclosed are methods and systems enabling rapid application development, verification, and deployment that require no more than knowledge of high level languages. Two aspects of the disclosed methods and systems are called Machine Intelligence and Learning for Graphic chip Accessibility (MILeGrA) and Machine Intelligence and Learning for Graphic chip Execution (MILeGrE). Using MILeGrA and MILeGrE, high-level language programmers (using Matlab, Julia, Python, etc.) do not need to learn, for example, general-purpose computing on Graphics Processing Units (GPU) programming languages, such as CUDA, Open CL, or even C and C++, yet the high-level programmers can still use coprocessors and benefit from results-in-seconds big data capabilities. MILeGrA makes it unnecessary to acquire specialized skills of networking, installing device drivers, and related hardware functions. MILeGrE enables a user to use high-level languages without knowing coprocessor programming details to generate and execute thread safe parallelized optimal code on CPUs and coprocessors. MILeGrA and MILeGrE are platform independent. They can be used across multiple operating systems (e.g., Windows, MAC, Linux, Unix, Solaris, IOS, Android) and hardware platforms, including running natively, on cloud based platforms, virtual machines, and a hybrid platform that is a combination of different hardware platforms. MILeGrA and MILeGrE can provide feedback regarding the source code at various levels, including optimizations used, parallelization schema implemented, threading model used, and instruction ordering on multiple coprocessors, if present. MILeGrA and MILeGrE can also provide feedback regarding code syntax corrections, as it rewrites the source code. MILeGrA and MILeGrE can be used together or independently of each other.

An example practical application of the disclosed methods and systems can involve data fusion for three-dimensional plus time (3D+T) reconstruction from lower, two-dimensional plus time (2D+T) projections of cerebrovascular blood flow using a mathematical formulation that simultaneously back-projects measurements, regularizes, smoothes, and segment to provide 3D+T blood flow from low dimension projections. Executing such a mathematical formulation on Matlab would take hours to provide output on a Windows or Linux machine. Obtaining the help of a programmer skilled in coprocessor programming would take two person-months for the programmer to develop an application that could achieve results of the mathematical formulation in seconds. Using MILeGrA and MILeGrE, however, a Matlab programmer can achieve results using the Matlab code in a matter of seconds.

Figure 1:
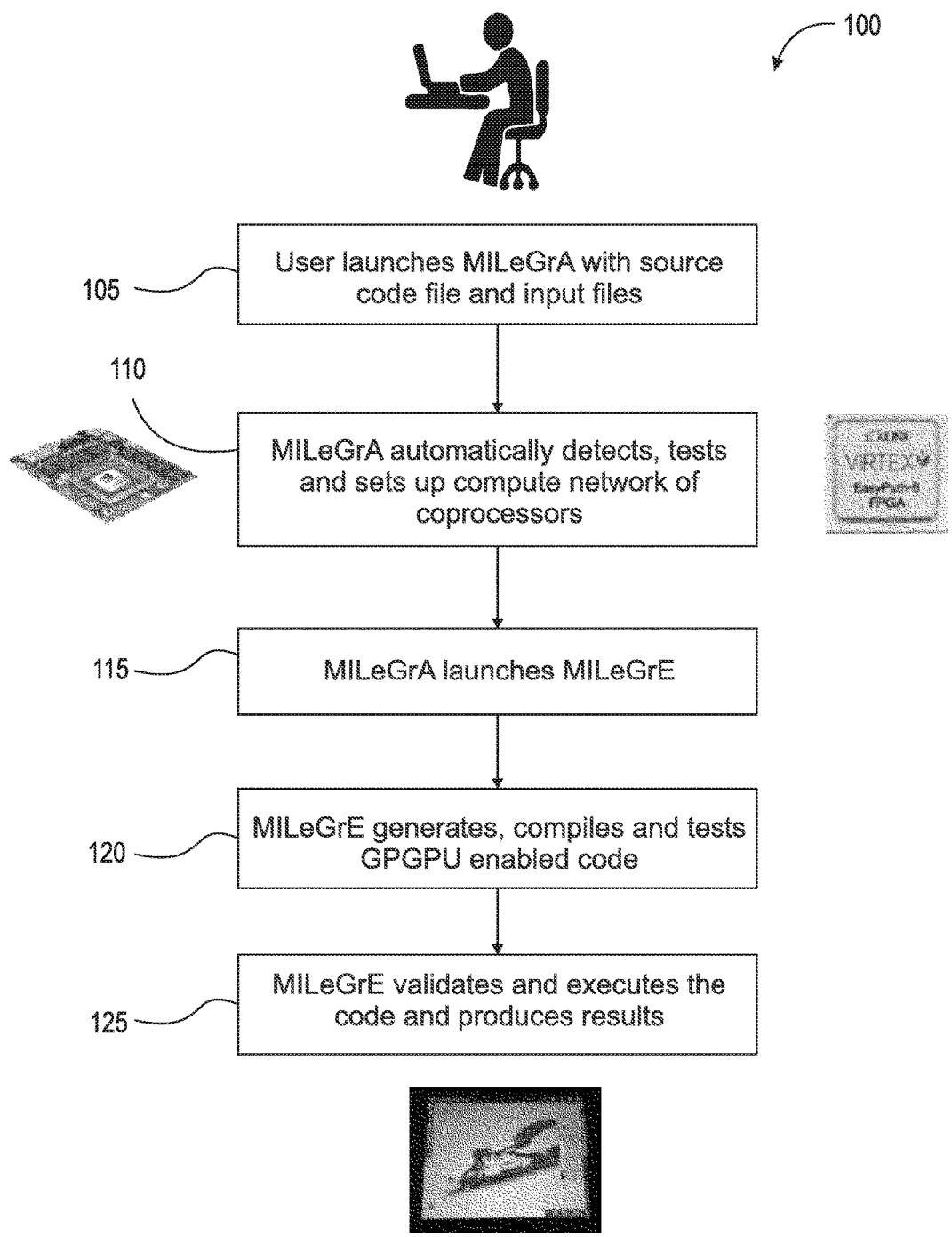
FIG. 1 is a flow chart illustrating a method of using a Machine Intelligence and Learning for Graphic chip Accessibility (MILeGrA) method and a Machine Intelligence and Learning for Graphic chip Execution (MILeGrE) method to create a representation of a device network having coprocessors and enable execution of coprocessor-unaware computer code on the coprocessors, according to an example embodiment.

FIG. 1 is a flow chart illustrating a method 100 of using MILeGrA and a MILeGrE to create a representation of a device network having coprocessors and enable execution of coprocessor-unaware computer code on the coprocessors, according to an example embodiment. According to the example method 100, a user can launch 105 MILeGrA with source code (and any other associated input files or information). The source code is written in coprocessor-unaware computer code. Associated input files may include, for example, input data files (e.g., .mat, .dat, .xslx), source code (e.g., .m files), and commands on what to set up. MILeGrA detects, tests, and sets up 110 a representation of a network of coprocessors. MILeGrA can launch 115 MILeGrE with the representation of the coprocessor network. MILeGrE generates, compiles, and tests 120 coprocessor-aware code to be executed by the network of coprocessors. MILeGrE can also then validate and execute the coprocessor-aware code 125.

Figure 2:
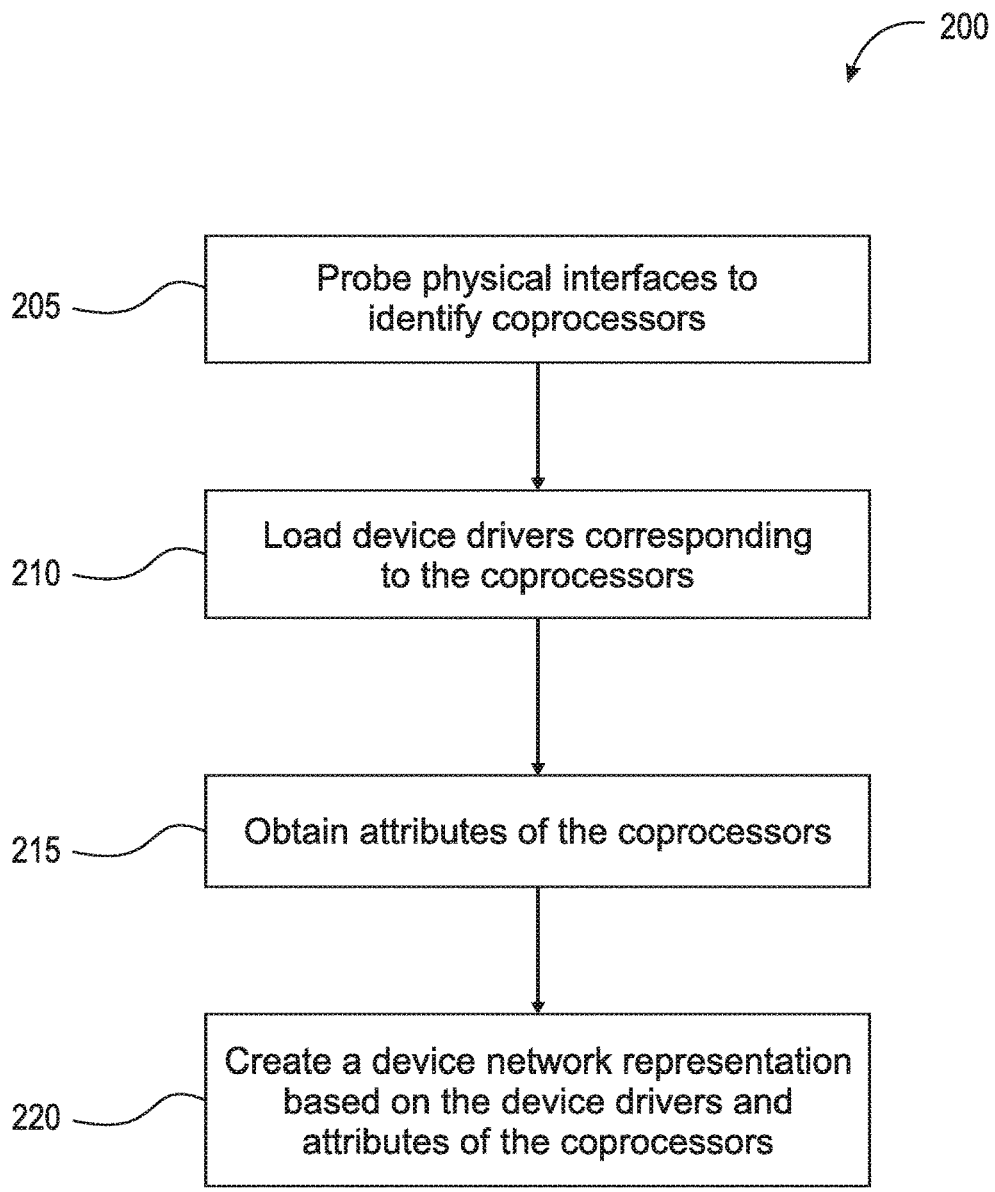
FIG. 2 is a flow chart illustrating a method of creating a representation of a device network having coprocessors, according to an example embodiment.

FIG. 2 is a flow chart illustrating a method 200 (e.g., performed by MILeGrA) of creating a representation of a device network having coprocessors, according to an example embodiment. The example method 200 includes probing 205 physical interfaces to identify coprocessors, loading 210 device drivers corresponding to the coprocessors, obtaining 215 attributes of the coprocessors, and creating 220 a device network representation based on the device drivers and attributes of the coprocessors. Detailed examples for each step of the method 200 are provided below.

Figure 3:
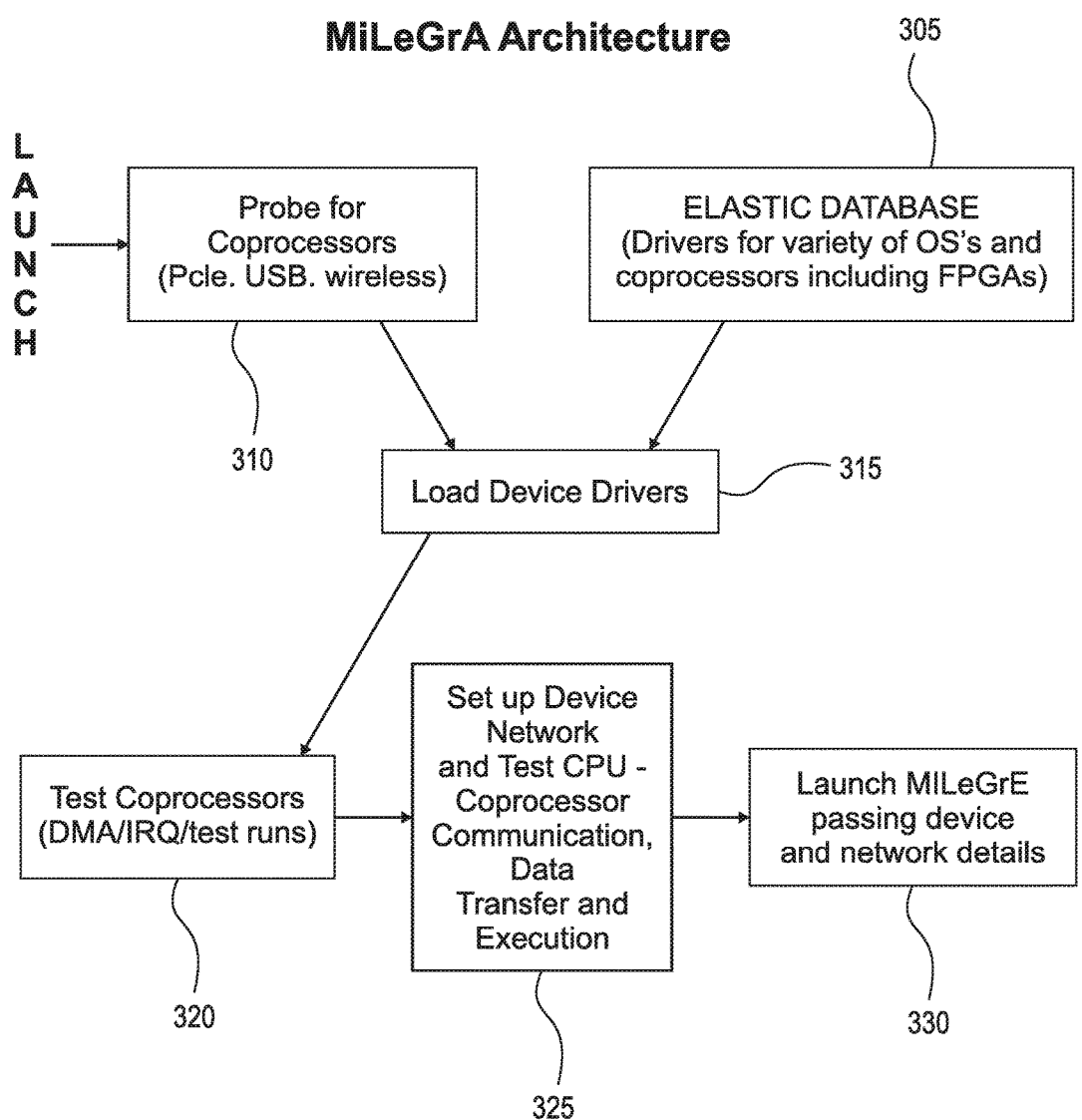
FIG. 3 is a block diagram illustrating an example architecture of MILeGrA, according to an example embodiment.

FIG. 3 is a block diagram illustrating an example architecture of MILeGrA. MILeGrA can include a module 305 for recognizing which type(s) of coprocessors are available. This information about networking and connectivity capability can be provided to MILeGrE. MILeGrA can provide an interface for recognizing and establishing device connectivity to coprocessors, such as GPUs that conform to OpenCL specifications and FPGA's that do not. MILeGrA can detect and use the correct device drivers based on the coprocessor's physical connection to the CPU (e.g., PCIe-bus, USB or wireless, such as Bluetooth). MILeGrA can sequentially scan and attempt to identify and access coprocessors automatically for available interfaces (e.g., PCIe, USB, wireless) and networks, and can test these devices before MILeGrE is launched. MILeGrA can use an elastic drivers database 305 that can be updated when new coprocessor types are introduced in the market from different vendors. MILeGrA can provide functionality by networking various computational platforms (e.g., servers, laptops, handheld devices, such as cellphones and tablets, and USB and wireless devices), maximizing resource utilization with no need for a user to learn about networking, device drivers, or coprocessor programming. MILeGrA may then directly launch the MILeGrE module if OpenCL compliant coprocessors are detected, but can also work in a heterogeneous environment having OpenCL compliant and non-OpenCL compliant coprocessors. In the latter case MILeGrE may launch after all devices are identified and tested to be accessible.

Probe for Coprocessors 310

Coprocessors (e.g., GPUs, FPGAs) physically interface via PCIe, USB, or wirelessly using various IEEE standards, such as Bluetooth. MILeGrA can probe the host system where launched (which can be CPU intensive) for all peripheral device interfaces available and can update the elastic database 305 with specifications, details, and operating system (OS) information. If MILeGrA finds coprocessor devices (with drivers already loaded), it can add the information to the elastic database 305. Detailed host OS and metric information can also be added, such as PCIe, USB, or wireless speeds, free memory, number of CPU ALU cores, core libraries availability for device drivers, etc. into the elastic database 305.

Load Device Drivers 315/Test Coprocessors 320

From the elastic database 305, based on the peripheral interfaces present, coprocessor (e.g., GPU and FPGA) device drivers can be loaded for supported interfaces. The elastic database 305 can also hold device drivers and other specifications for the drivers, such as library dependencies and test programs. For each coprocessor present, a set of tests can be run to check direct memory access (DMA), interrupt requests (IRQs), driver queries for firmware version, and a typical application can be run on the coprocessor. The results can be collected and metrics can be assigned to each coprocessor, and the elastic database 305 updated.

Set up Device Network and Test CPU 325

CPU-coprocessor direct and indirect communications can be tested. A device network is set up, assigning IP addresses if needed, and priorities to the device identifiers. A sample test run can be performed to check the devices for communication, data transfer, and execution and to ensure drivers are functioning and stable. The information can then be stored in an input parameters file for passing to MILeGrE when launched. FIG. 4 illustrates example data representing a device network for including in such an input parameters file.

Launch MILeGrE 330

MILeGrE can be launched using the input parameters file (e.g., from MILeGrA) and the coprocessor-unaware source code file (e.g., *.m or *.mat file) and any other input data or files that may be needed or desired.

Figure 5:
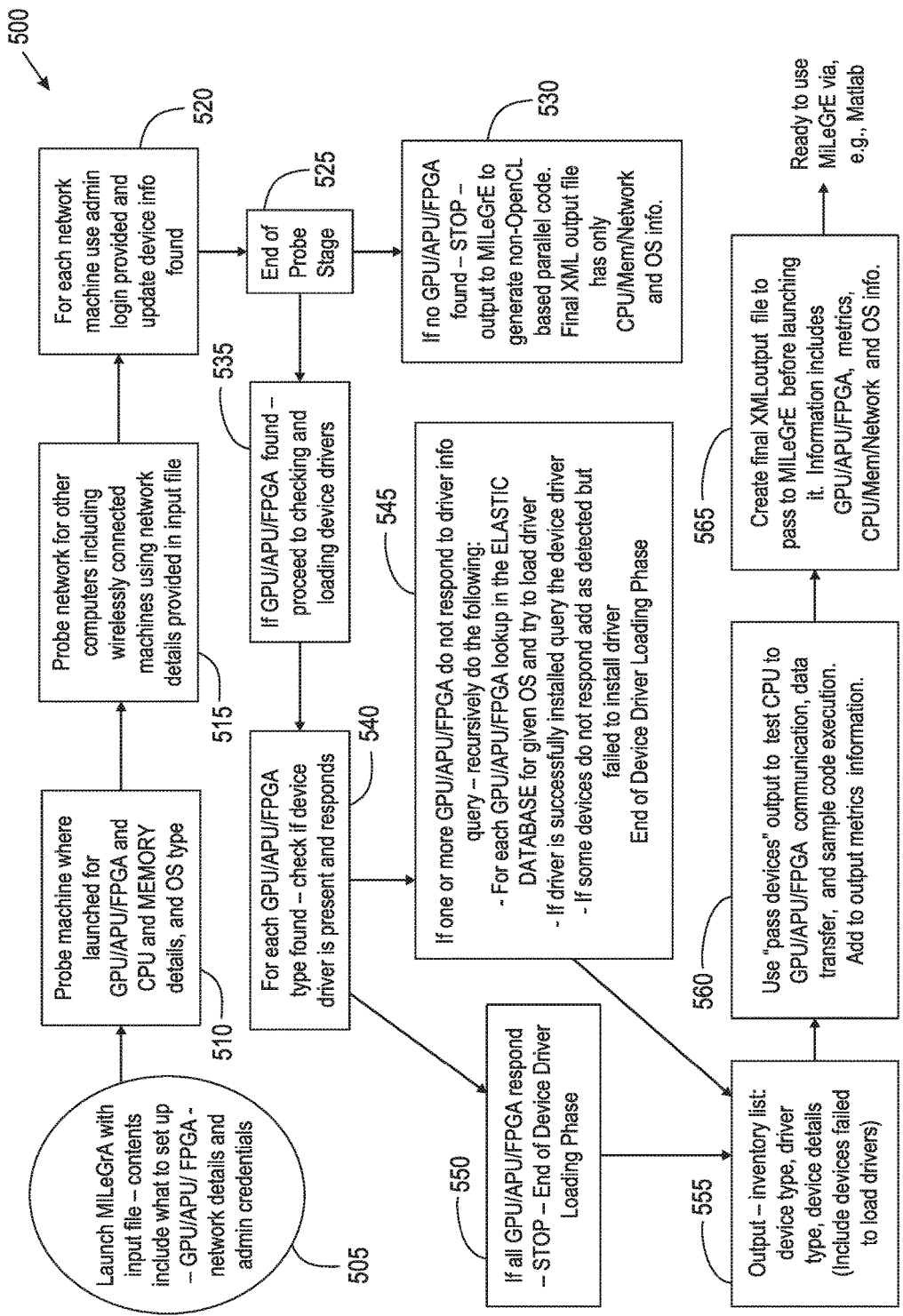
FIG. 5 is a flow chart illustrating a method of creating a representation of a device network having coprocessors, according to an example embodiment.

FIG. 5 is a more detailed flow chart illustrating a method 500 of creating a representation of a device network having coprocessors, according to an example embodiment. According to the example method 500, MILeGrA can be launched 505 with an input file (e.g., coprocessor-unaware computer code) and other possible details, such as what type of network to set up (e.g., GPU/APU/FPGA) and administration credentials. MILeGrA can continue by probing 510 the machine where MILeGrA is launched for GPU/APU/FPGA processors, and probing CPU, memory details, and OS type. The network can also be probed 515 for other computers, including wirelessly-connected machines using network details provided in or with the input file. For each network machine, an administrator login can be used 520, and any device information found can be updated.

When probing is complete 525, if no GPU/APU/FPGA processor is found, then MILeGrA can stop 530, and the information found can be sent to MILeGrE to generate non-OpenCL-based coprocessor-aware computer code. The final output file created by MILeGrA can, in this case, have only CPU, memory, network, and OS information. If at least one GPU/APU/FPGA coprocessor is found, then MILeGrA can proceed 535 to check and load device drivers.

For each GPU/APU/FPGA type found, check 540 whether a device driver is present and whether it responds. If one or more GPU/APU/FPGA does not respond to a driver information query, then the following can be recursively performed 545. For each GPU/APU/FPGA, lookup a driver in the elastic database 305 (FIG. 3) for a given OS and try to load the driver. If the driver is successfully installed, query the device driver. If some devices do not respond, then specify the driver as being detected but also as failing to install. If all GPU/APU/FPGA processors respond, then end 550 the device driver loading phase.

MILeGrA can then output 555 an inventory list, including, for example, device type, driver type, and device details. The inventory list can include devices that failed to load drivers. This information can be used to test 560 CPU-to-GPU/APU/FPGA processor communications, data transfer, and sample code execution. MILeGrA can then create 565 an output file (e.g., in XML) to provide to MILeGrE. Information in the output file can include GPU/APU/FPGA information, metrics, and CPU, memory, network, and OS information. FIG. 4 illustrates sample output data.

Figure 6:
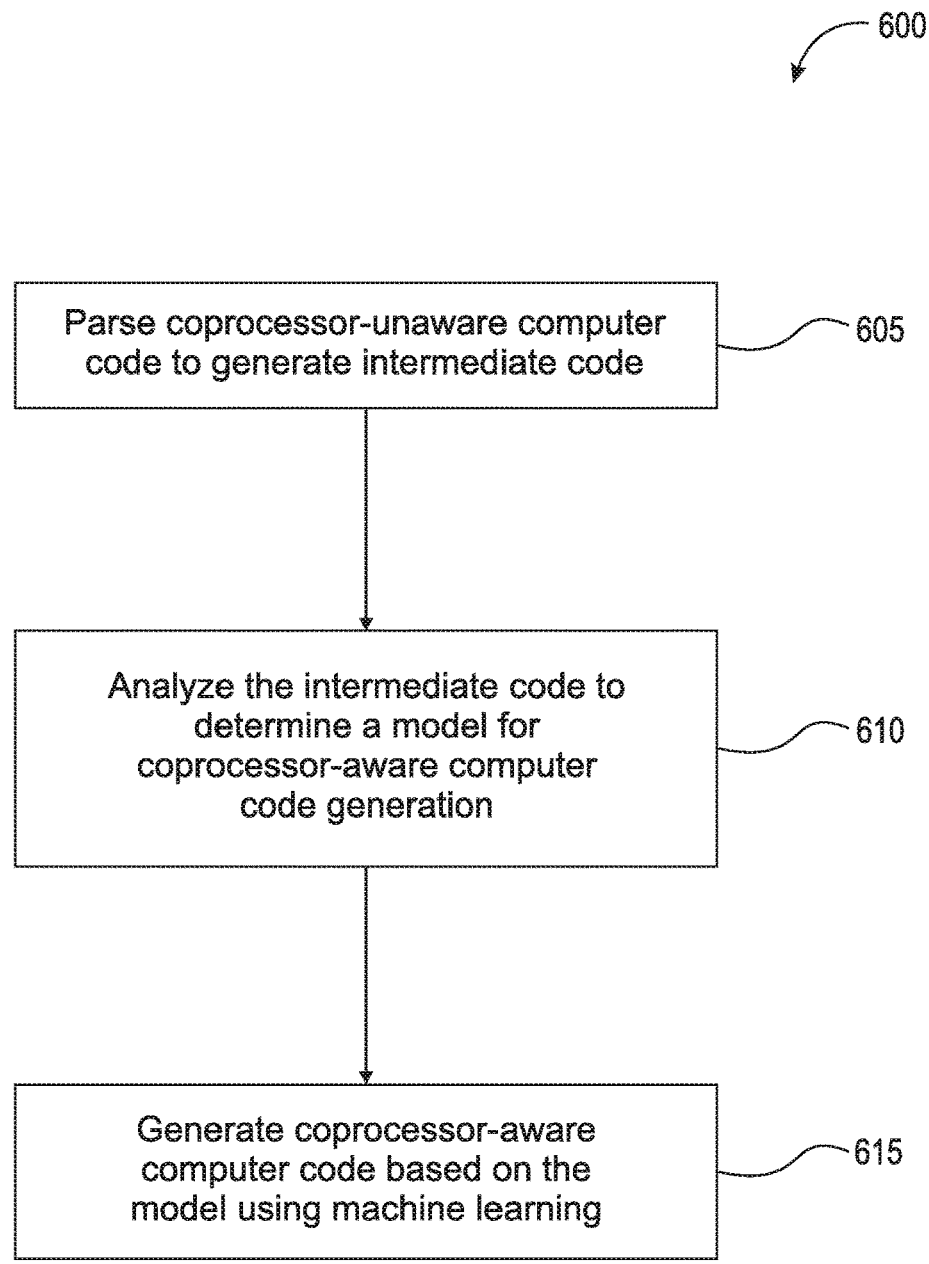
FIG. 6 is a flow chart illustrating a method of enabling execution of coprocessor-unaware computer code on coprocessors, according to an example embodiment.

FIG. 6 is a flow chart illustrating a method 600 (e.g., MILeGrE) of enabling execution of coprocessor-unaware computer code on coprocessors, according to an example embodiment. The example method 600 includes parsing 605 coprocessor-unaware computer code to generate intermediate code. The intermediate code is analyzed 610 to determine a model for coprocessor-aware computer code generation, and coprocessor-aware computer code is generated 615 based on the model using machine learning. Detailed examples for each step of the method 600 are provided below.

Figure 7:
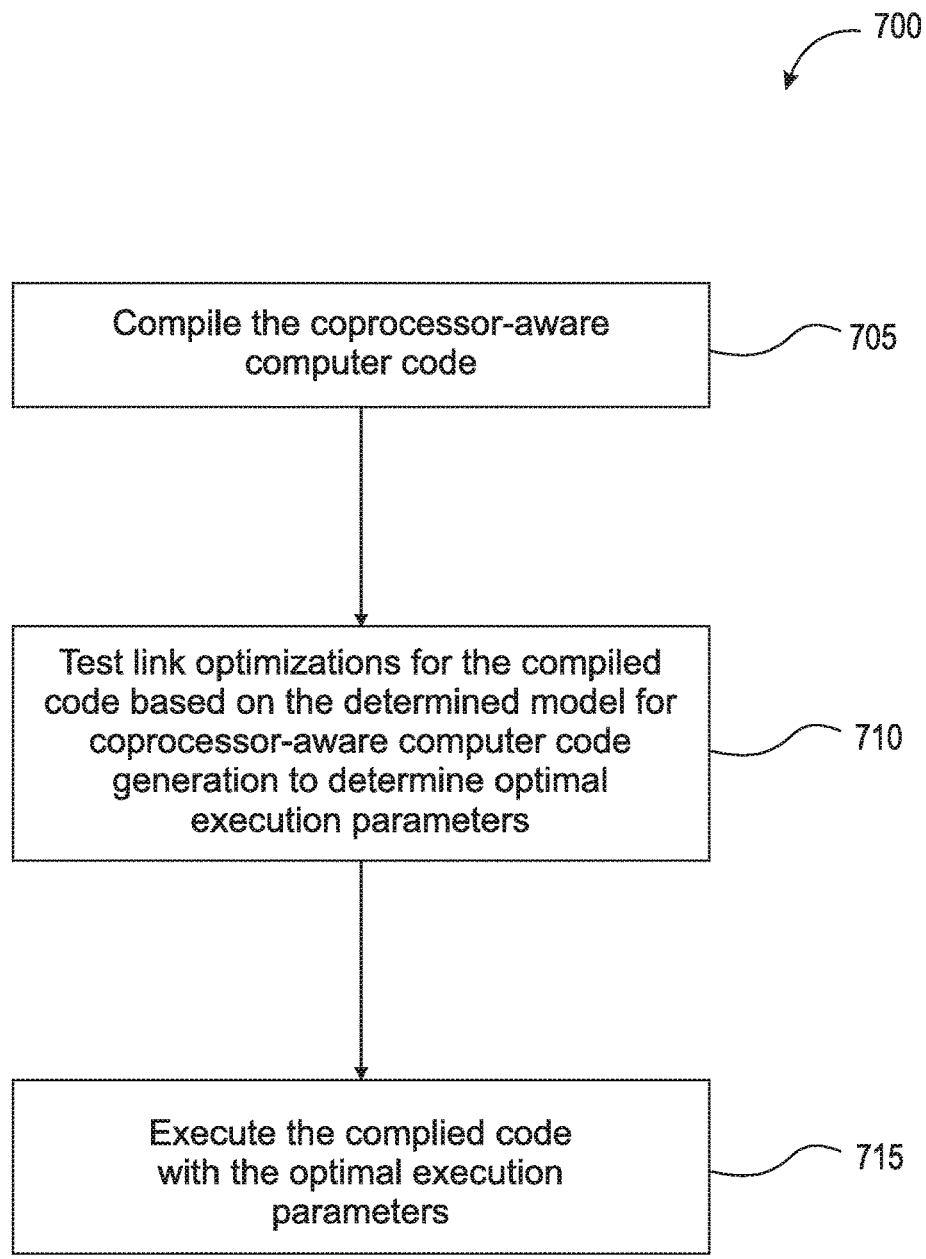
FIG. 7 is a flow chart illustrating execution of complied code with optimal execution parameters, according to an example embodiment.

FIG. 7 is a flow chart illustrating execution of complied code with optimal execution parameters, according to an example embodiment. After coprocessor-aware computer code is generated 615 (FIG. 6), the coprocessor-aware computer code can be compiled 705, and link optimizations for the compiled code can be tested 710 based on the model (see 610, FIG. 6) to determine optimal execution parameters. The complied code can then be executed 715 on the coprocessors with the optimal execution parameters.

Figure 8:
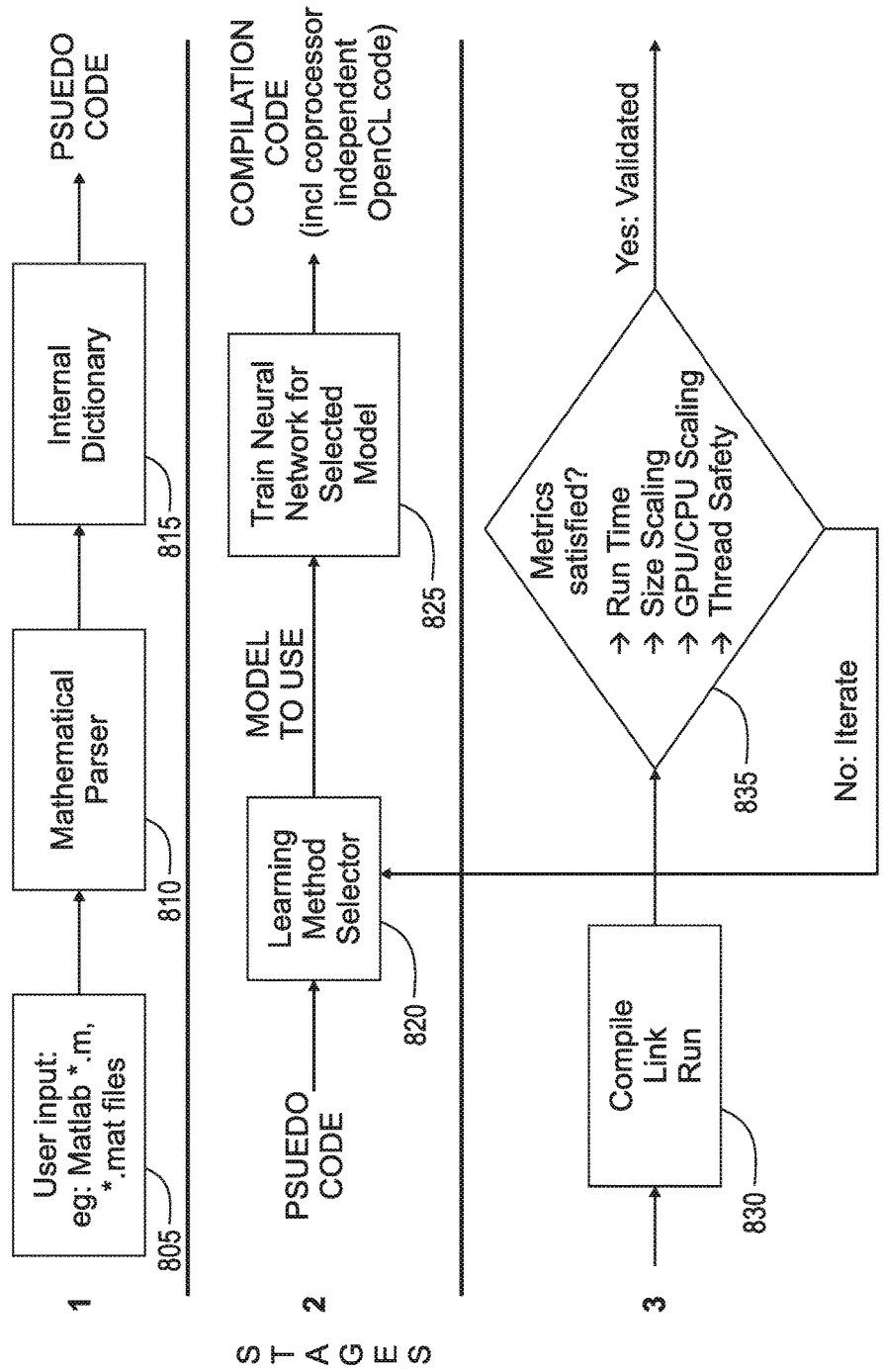
FIGS. 8 and 9 are block diagrams illustrating an example architecture of MILeGrE, according to an example embodiment.
Figure 9:
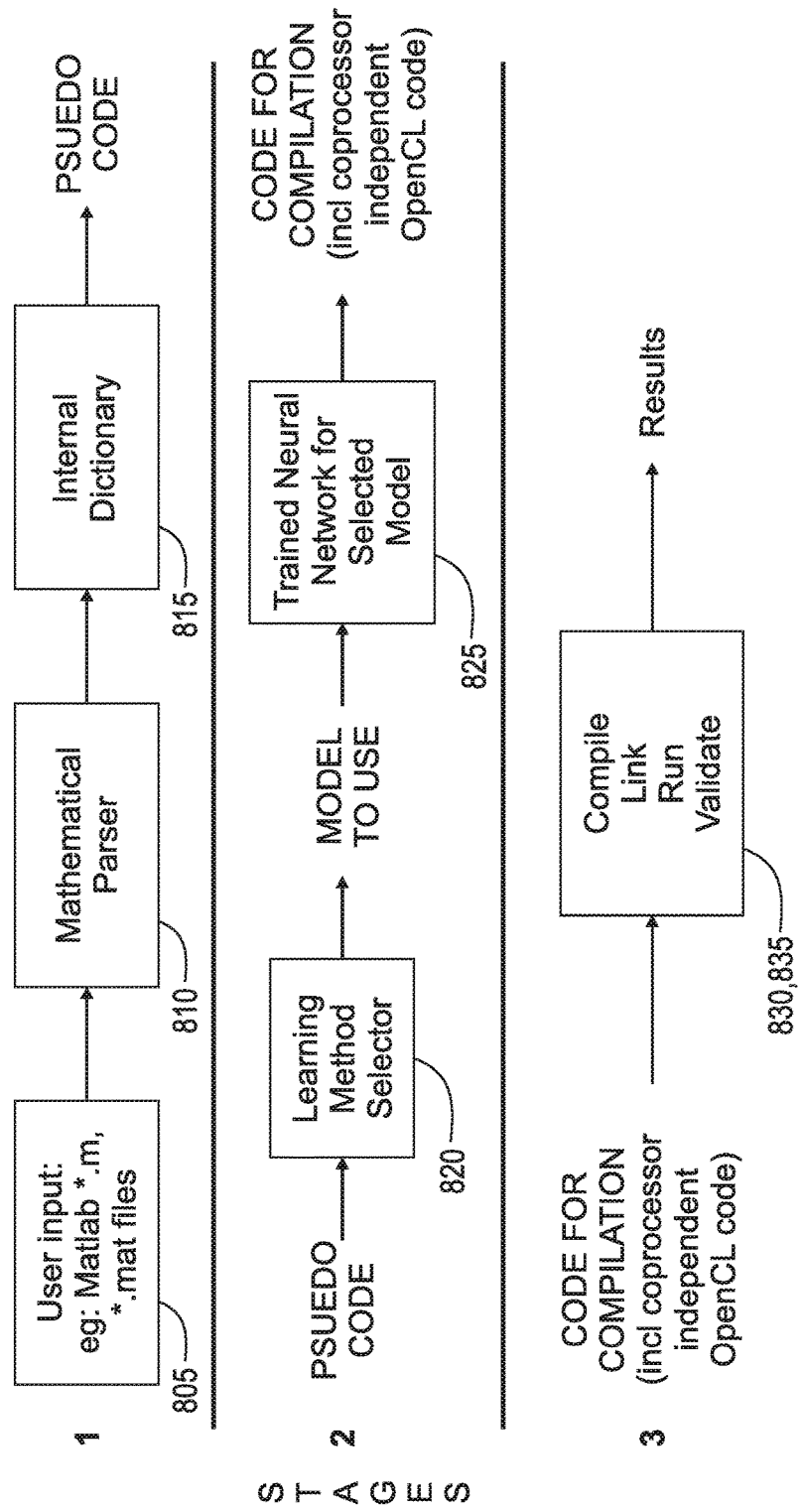

FIGS. 8 and 9 are block diagrams illustrating an example architecture of MILeGrE. FIG. 8 illustrates training of a neural network used by MILeGrE, and FIG. 9 illustrates a deployment of MILeGrE after the neural network is trained. As described above, MILeGrE is a coprocessor/processor compiler for coprocessor-unaware programming languages (Matlab, Julia, Python, C, Fortran etc.) that can enable rapid application development, optimization, testing, and deployment without a programmer having to learn coprocessor programming. The output of MILeGrE can be a highly optimized device-dependent thread-safe implementation of the designer's higher language mathematical construct. MILeGrE uses machine learning to produce, for example, an OpenCL model of the construct if only OpenCL compliant coprocessors are detected, or hybrid code for a mixture of coprocessor types. MILeGrE mitigates the need for a programmer to learn CUDA-like languages and the related architectural understanding and skill-sets required for meeting computational goals. Because MILeGrE employs machine learning, MILeGrE can automatically learn and update itself, even when it validates and runs generated code. MILeGrE can be implemented as a cloud-centric application that can be deployed on, for example, OpenStack, VMWare, Azure, AWS, Google Cloud, or any other hybrid cloud platform or service.

Mathematical Parser 810

After coprocessor-unaware computer code is input 805 into MILeGrE, a mathematical parser 810 parses the input file (e.g., Matlab *.m file) and determines with regular expressions a list of parameters and variables. Such parameters and variables can include, for example: Type (int, float, char, array); Bound (min, max); Global and local parameters and scoping rules; Initial Values (or if uninitialized—dynamic allocation at run time); Extract standard and non-standard vocabulary (e.g., in Matlab, if a user-defined function is called versus a built-in Matlab function); Extract random number distribution ops; Extract conditional statements; Extract coupled equations and boundary values; Recognize and Assign to Numerical Method. The following is an example of an intermediate code generated by parsing high-level source code: "r=sum(exc)+B+cos(2*pi*O" can become "pop%(id)s.r[i]=pop%(id)s.sum_exc[i]+pop%(id)s.B+cos(2.0*M_PI*double(t)*dt))"

Figure 10:
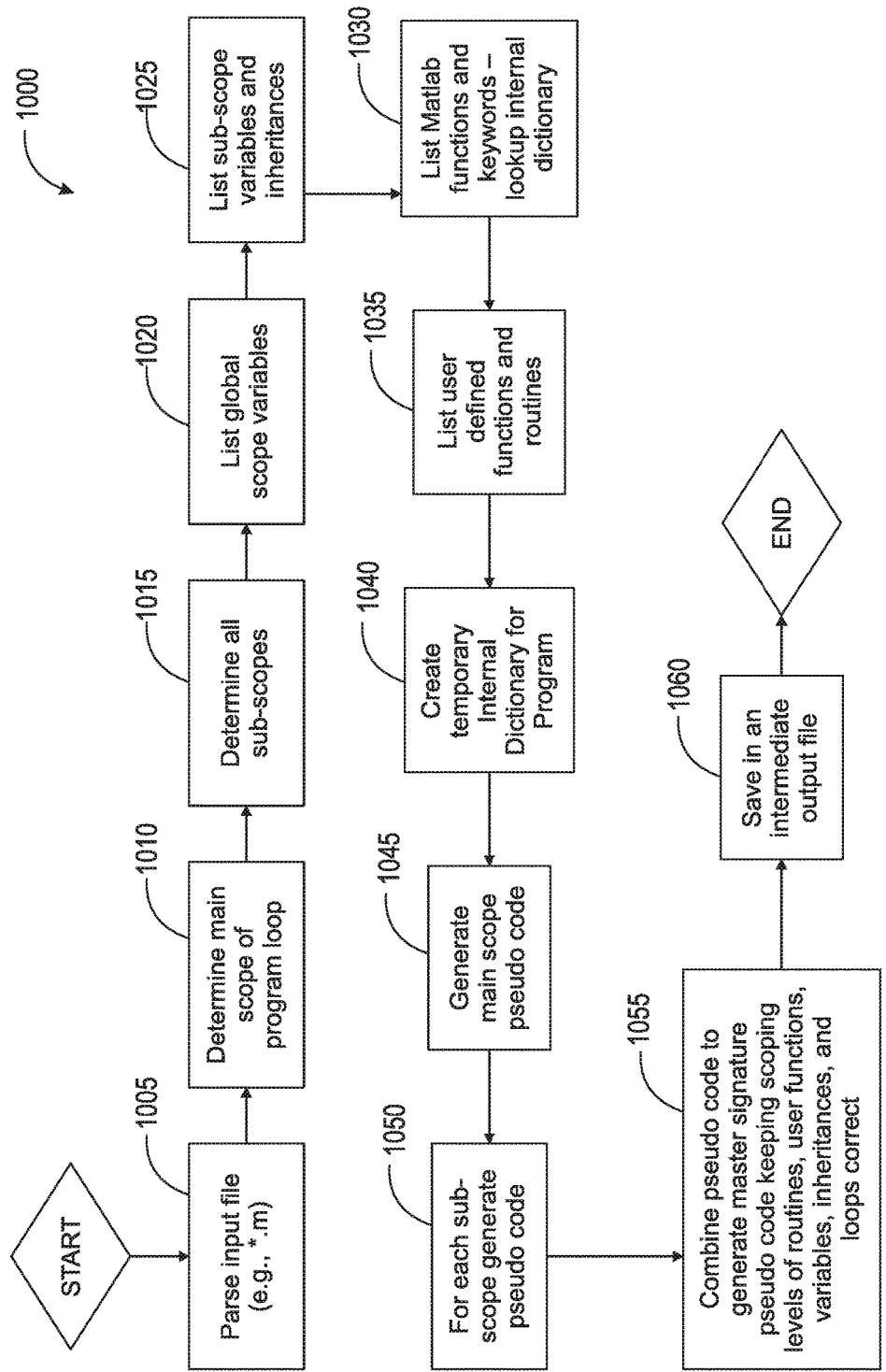
FIG. 10 is a flow chart illustrating parsing coprocessor-unaware computer code to generate intermediate code, according to an example embodiment.

FIG. 10 is a flow chart illustrating parsing 1000 coprocessor-unaware computer code to generate intermediate code. A file including coprocessor-unaware computer code is parsed 1005 by the mathematical parser 810, and a main scope of the program is determined 1010. Sub-scopes are also determined 1015. Global scope variables are listed 1020, and sub-scope variables and inheritances are listed 1025. Functions (e.g., Matlab functions) and keywords are listed 1030, which can involve referencing an internal dictionary, and user-defined functions and routines are listed 1035. The mathematical parser 810 can then create 1040 a temporary internal dictionary 815 for the code. The mathematical parser 810 can then generate 1045 pseudo code for the main scope of the program, and generate 1050 pseudo code for each sub-scope. The generated pseudo codes are combined 1055 to generate a master signature pseudo code, keeping scoping levels of routines, user functions, variables, inheritances, and loops correct. The pseudo code can then be saved 1060 in an intermediate output file.

The following is an example generation of pseudo code. Consider an example line of code: r=sum(exc)+B+cos(2*pi*t)

Assume "B" is a variable of global scope, "r" is a local function variable that is returned to a variable of global scope, "sum" is a user defined function, "cos" is a reserved key word (function), "pi" is a reserved key word (constant), and "t" is variable of local scope that is passed to via a function call from a variable of global scope. "=", "+" and "*" are reserved assignment variables. "(" and ")" have their own rules within a statement set and are reserved assignment variables.

Each line, when parsed, is assigned a scope and related tags (function, reserved character, reserved constant, assignment operator) by referencing the internal dictionary and checking if the rules for user-defined rules and functions are satisfied. In this case "cos" may be present in the internal dictionary, but "sum" may not. "sum" may be defined later in the code with the correct function definition syntax as outlined for user-defined functions in the internal parser. So it can be assigned as a user-defined function.

Next, "r" can be popped from the stack to the global variable, the results of "sum" and "B" can be returned, and "pop%" can be added with a unique "id" and added as an instance of "s" in the pseudo code. A user-defined function can be renamed in a unique manner, "sum_exc". "B" is of global scope, and "cos", as a reserved function, can remain the same. "t" can be further enumerated by type as a double. "M" can be added to "PI" and normalized to upper case. "dt" shows that the routine is part of a partial sum, in a FOR loop. "2" can be updated to reflect a double variable. "pop%(id)s" shows in the pseudo scope that the variables are returned as level s with given id, r[i], exc[i] are the output and input variables (the former is left of "=" a reserved assignment operator), and the "_" shows that "sum" depends on "exc[i]" as input. The final output is shown below, which is a unique pseudo code with a fixed signature. Different coding styles using different variable names of different scoping will generate similar signatures normalized by "s." prefixes as shown below and "dt" variables showing partial sums. Result: pop%(id)s.r[i]=pop%(id)s.sum_exc[i]+pop%(id)s.B+cos(2.0*M_PI*double(t)*dt))

Learning Method Selector 820 and Neural Network Modules 825

The learning method selector 820 can be, for example, Support Vector Machine (SVM) based, and can output, for example, a model and numerical method. Other classification techniques may also be used, such as Linear Discriminant Analysis (LDA), Null Space Linear Discriminant Analysis (NLDA), K-Nearest Neighbor (KNN), and Learning Bayesian Networks (LBN). Based on the model and numerical method output from the learning method selector, machine intelligence methods (e.g., CNNs, RNNs, LBN) may be used for training 825 and the method with best generalization can be selected and saved for the given model. Learning can proceed with various training input sets (samples of intermediate code and corresponding models) provided, and the trained model is built and validated with a testing set. If convergence criteria is not determined, it can be found and the internal dictionary for the given model can be updated. The output may be passed into the compiler at compile-time.

Learning Method Selector 820

The purpose of the learning method selector 820 is to select a model and numerical method to use for code generation. For example, SVM, LDA, NLDA, KNN, or LBN can be used via supervised learning. Labeled pseudo code (intermediate code from the mathematical parser 810) can be input and the classification technique can be used to learn the classification for the code for the model based on an extensive training set and validation set for the given model based on numerous variations of the code for that given model and numerical methods used. Each model and numerical method, with all the variations of code that can be used for that particular model with the associated numerical methods, can be linearly separable. All possible input pseudo code for a particular model can be mapped after training to a higher dimensional feature space that uniquely gives a consistent output (classification). The output can be mapped to the model to be used, and a corresponding trained neural network can be selected to use the pseudo code (intermediate code) to generate the coprocessor-aware computer code for compilation.

Trained Neural Network for the Selected Model 825

Convolution Neural Networks (CNNs), Recurrent Neural Networks (RNNs), Deep Learning, or Learning Bayesian Networks (LBNs), for example, can be used to train the neural network based on pseudo code and provide an OpenCL based code, for example, as output for compilation. For a given set of pseudo codes possible in the given model and associated numerical methods after training, a most generalized network from among machine learning techniques (e.g., CNN, RNN, LBN) can be selected and saved. The testing/validation set can be used in this determination. In both cases, the input is pseudo code, and output is coprocessor-aware computer code for compilation.

Compile, Link, Run, and Validate 830, 835

Coprocessor-aware computer code for compilation is generated, which can include OpenCL code for coprocessor independent compilation and execution. All link dependencies can be resolved and a link listing can be created. Various optimizations can also be tested and linker output can be stored and parsed. At run-time, the various link optimizations can be tested. The coprocessor-aware implementation can be checked to determine whether it is sufficiently fast by, for example, checking the number of coprocessors on a given node or set of nodes, and checking the type of coprocessors. Then, starting by using one coprocessor, runs can be scaled up to use all coprocessors on the given node. Run-time scaling can be checked. If there is one coprocessor, threads can be scaled up on the single coprocessor. If using Matlab MDCS, for example, and having more than one coprocessor server, the scaling can be repeated across servers and coprocessors. Size scaling can also be checked, which is similar to run-time but involves repeatedly increasing the problem size after checking RAM available in main memory (CPU) and coprocessors. Different trained models may have different linkage requirements, but only one set of linked code is selected to be run. Thread safety is checked before selecting the code to be run by checking whether different link optimizations provide the same results on a given input set. Several input sets scaled out can be used to check for thread safety. Testing may be performed by launching the program with different input sets. If everything passes, the optimal run parameters are saved, and the internal dictionary with the parameters and machine intelligence learning state is saved for the given model; otherwise, the process can iterate. Raw output is generated and saved and can be processed further.

Parallel code can be generated based on a device network representation and, further, on the number and types of coprocessors and the number of types of CPUs and type and size of main memory (RAM). In addition, it can be based on the memory available in CPUs and coprocessors (combined over all coprocessors if more than one is present). The type of data level parallelism that is implemented can ensure optimal use of memory resources and minimal swap for speedup. Scalability with number of spreads and problem size can be insured.

Validation can differ between training and final deployment. During training, the validation stage (assuming outputted code links, compiles, and runs) involves determining run times, size scaling by increasing problem size, and size scaling by increasing coprocessor threads (if coprocessor(s) are present) to span progressively one or more coprocessor(s), and checking for thread safety.

Run-Times: Based on the SVM output (problem class), runtimes can be calculated for varying numbers of coprocessor threads. This can be correlated with size scaling. A heuristic approach can start with small, medium, and large data sets for the problem class. Run-times can be stored for each data set, with increasing numbers of coprocessor threads spanning up to eight coprocessors per server, for example.

Size Scaling I (problem size): The run-times can be used to find size scaling—optimal number of threads and coprocessors to use for a given problem size. This can be stored for the given problem class.

Size Scaling II (coprocessor spanning): The run-times can be used to find size scaling—optimal problem size for a given number of coprocessor threads. This can also be stored for the given problem class.

Checking Thread Safety: When determining run-times for a given run, three separate runs can be performed. If the same results are achieved (within statistical bounds) for every problem size and thread size, then the code is thread safe. The statistical bounds can be saved for the given problem class.

During deployment, the validation stage has, for the given problem class, a knowledge base available from the training stage. After the input problem size is determined, a fixed procedure can be followed.

Run-Times: Based on the classification output (problem class) and problem size, the knowledge base can be referenced and a limited trial run for the problem size using the optimal number of threads and coprocessors can be performed and compared to the times in the knowledge base. If this is within an acceptable margin of error, the next step can be initiated.

Size Scaling I (Problem Size): Scaling can be checked for a limited variance of the problem size based on the run-time deviations. Again, the best set for number of threads to use can be determined and checked with the data in the knowledge base.

Size Scaling II (coprocessor spanning): For the given problem size, a limited test can be performed by varying coprocessor threads and checking against the knowledge base. The run-time deviations from the Run Times stage can be used as references.

Checking Thread Safety: For the given problem size and selected number of coprocessor threads, three constrained runs can be started and results checked. If within error bounds specified in the knowledge base for the given problem class, then the job can be started and the code and compilation is considered to be thread-safe.

The following are examples of validation runs for training versus deployment for an example problem class of "Eigen Values of a Square Matrix (n×n)."

Training: Start with a set of algorithms—several can be used. In this example, Lanczos algorithm, power interaction, and QR factorization can be used. In some embodiments, at least five algorithms may be tried at this stage and results stored in the knowledge base.

For all three of the above example algorithms, generate OpenCL code. Run both examples with varying size matrices N—10 to 10^8. Start with 10 (N) coprocessor threads and sub-matrices going from N to N*1000 in increment steps of 10x. Go up to 10^4 coprocessor threads in increment steps of 10x. Note run times and check results for each step and store data in the knowledge base. Repeat with different precision numbers in the matrix including complex. Generate a correlation table showing best performance for a given matrix type. This completes the validation stage training for the given problem class.

Deployment: Reference the knowledge base correlation table for the given problem class. Select the best algorithm to use and generate OpenCL code. Check compilation and linkage and enter the validation stage. According to the knowledge base correlation table for the problem, input the matrix size and run a small subset of tests. Vary the number of coprocessor threads, sub-matrices number, and problem size to within a small range as specified in the correlation table of the knowledgebase. A full solution need not be run, just a fixed number of steps—time constrained—as specified in the knowledge base. For example, if the run is expected to take twenty hours, run only for one minute and check which parameter set is fastest. Repeat with three different runs and check whether the results for one-minute runs are within acceptable error limits for the fastest parameter set. This completes the thread safety check. Now start the full run through completion. Update the knowledge base after the run with details of the run, and improve the correlation table. This completes the validation stage for deployment of the given problem class.

Figure 11:
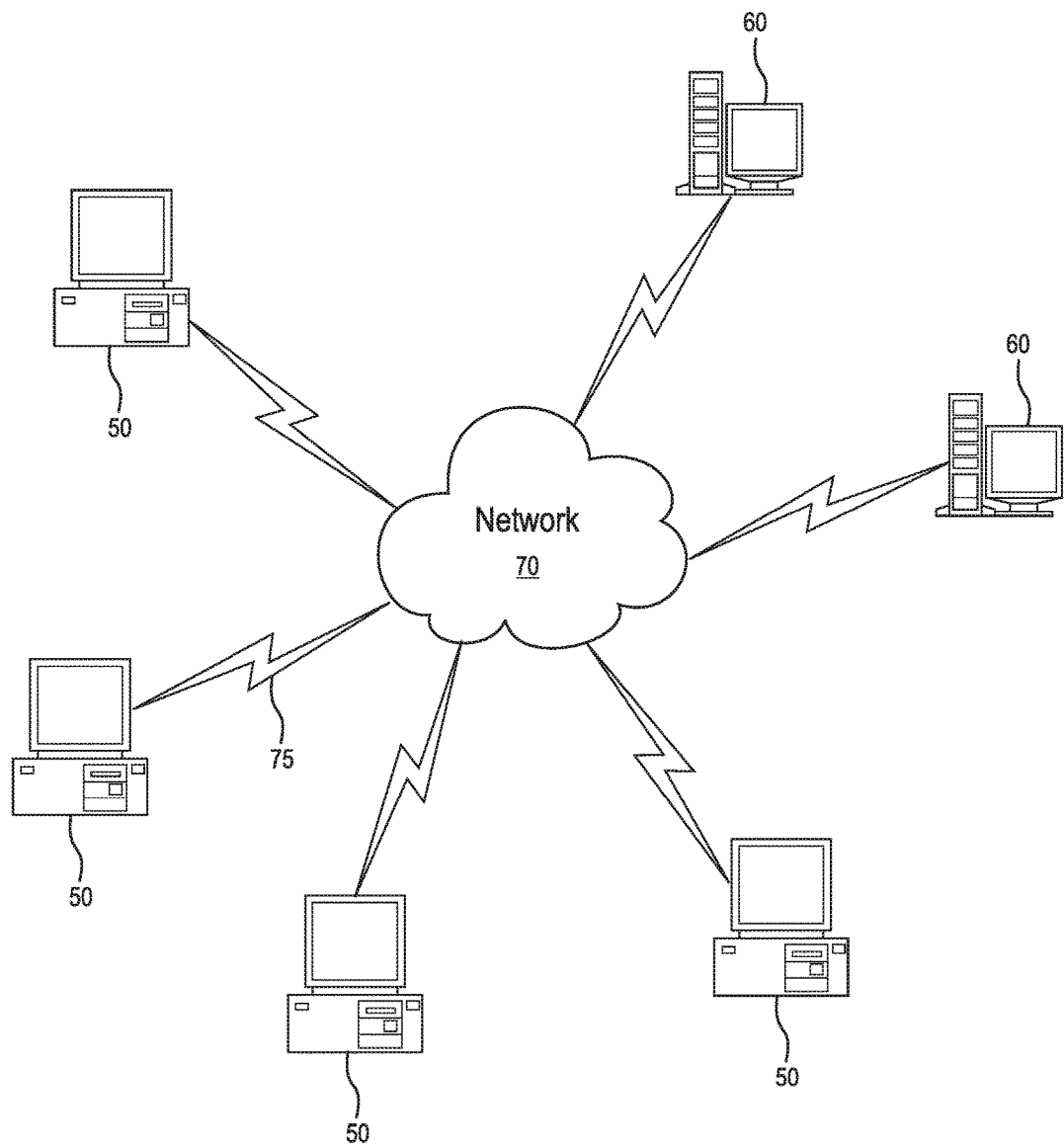
FIG. 11 is a schematic view of a computer network environment in which the example embodiments presented herein can be implemented.

FIG. 11 illustrates a computer network or similar digital processing environment in which the present embodiments may be implemented. Client computer(s)/devices/processors 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 12:
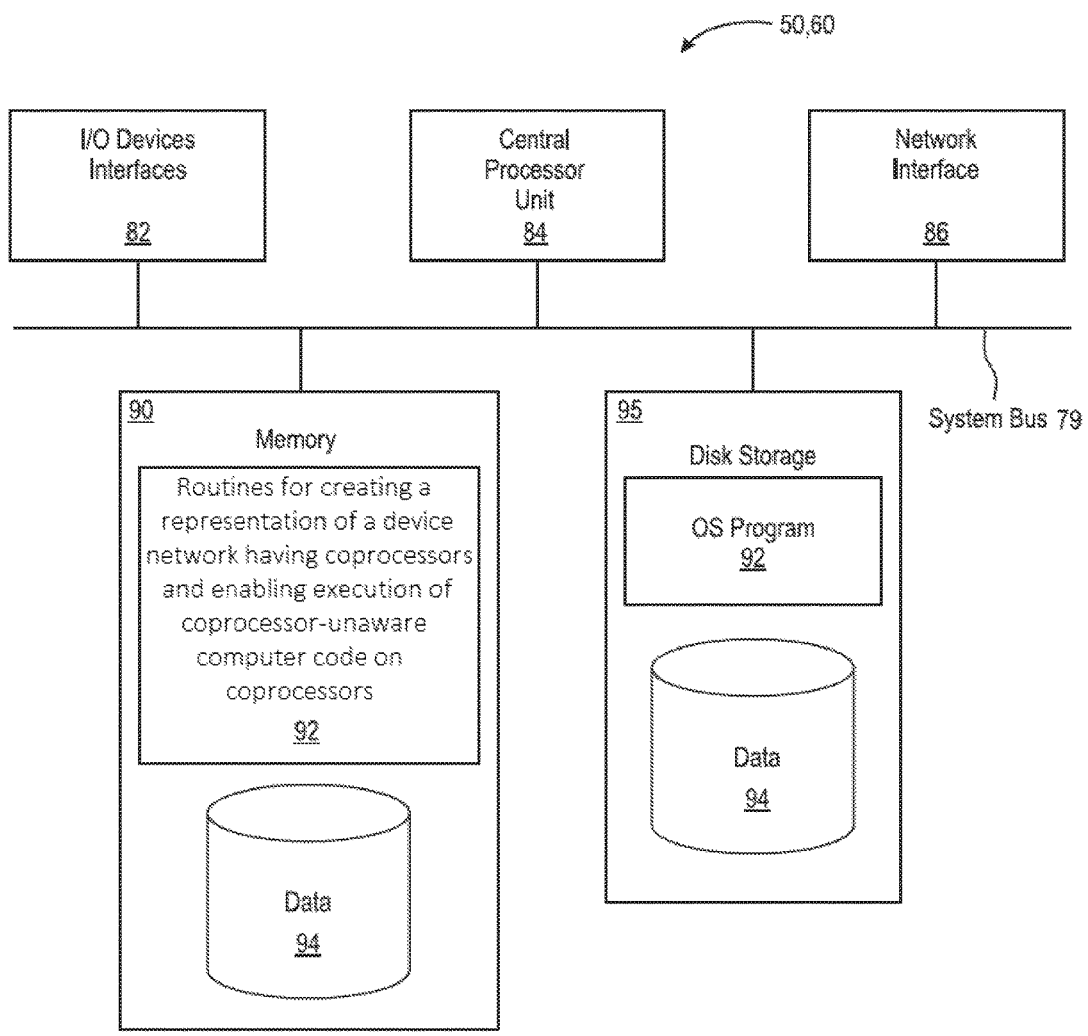
FIG. 12 is a block diagram illustrating an example computer node of the network of FIG. 11.

FIG. 12 is a diagram of the internal structure of a computer (e.g., client processor/device 50 or server computers 60) in the computer system of FIG. 11. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, and network ports) that enables the transfer of information between the elements. Attached to system bus 79 is I/O device interface 82 for connecting various input and output devices (e.g., keyboard, mouse, displays, printers, and speakers) to the computer 50, 60. Network interface 86 allows the computer to connect to various other devices attached to a network (e.g., network 70 of FIG. 11). Memory 90 provides volatile storage for computer software instructions 92 and data 94 used to implement many embodiments (e.g., code detailed above and in FIGS. 1, 2, 5-7, and 10 including routines 100, 200, 500, 600, 700, and 1000). Disk storage 95 provides non-volatile storage for computer software instructions 92 and data 94 used to implement many embodiments. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, and tapes) that provides at least a portion of the software instructions for the system. Computer program product 92 can be installed by any suitable software installation procedure, as is well known in the art. In another embodiment, at least a portion of the software instructions may also be downloaded over a cable, communication, and/or wireless connection. In other embodiments, the programs are a computer program propagated signal product 75 (FIG. 11) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

While example embodiments have been particularly shown and described, it will be understood by those skilled in the art that various changes in form and details may be made therein without departing from the scope of the embodiments encompassed by the appended claims.

What is claimed is:

1. A method of enabling execution of coprocessor-unaware computer code on coprocessors, the method comprising:
    parsing coprocessor-unaware computer code to generate intermediate code;
    analyzing the intermediate code to determine a model for coprocessor-aware computer code generation;
    generating coprocessor-aware computer code based on the model using machine learning; and
    compiling the coprocessor-aware computer code and executing the complied code.

2. A method as in claim 1 wherein the coprocessor-unaware computer code includes non-parallel computer code, and wherein the coprocessor-aware computer code includes thread safe and scalable parallel computer code.

3. A method as in claim 1 wherein generating coprocessor-aware computer code using machine learning includes using a neural network.

4. A method as in claim 3 further including training the neural network using samples of intermediate code and corresponding coprocessor-aware computer code.

5. A method as in claim 1 wherein the coprocessors are any of graphic processing units, field programmable gate arrays, accelerated processing units, and security layer processors.

6. A method as in claim 1 wherein the coprocessor-unaware computer code type is any of Matlab, Julia, Python, C, and Fortran programming languages, and wherein the coprocessor-aware computer code type is an OpenCL programming language.

7. A method as in claim 1 wherein analyzing the intermediate code includes determining a model for coprocessor-aware computer code generation based on training data including samples of intermediate code and corresponding models.

8. A method as in claim 1 wherein analyzing the intermediate code includes determining a numerical method, and wherein generating coprocessor-aware computer code includes generating coprocessor-aware computer code based on the model and the numerical method.

9. A method as in claim 1 further comprising:
testing link optimizations for the compiled code based on the model to determine optimal execution parameters and thread safety; and
wherein executing the complied code includes executing the complied code with the optimal execution parameters.

10. A method as in claim 1 further comprising:
probing physical interfaces to identify coprocessors;
loading device drivers corresponding to the coprocessors;
obtaining attributes of the coprocessors; and
creating a device network representation based on the device drivers and attributes of the coprocessors.

11. A method as in claim 10 further including storing the device drivers in an elastic database.

12. A method as in claim 10 wherein generating coprocessor-aware computer code includes generating coprocessor-aware computer code based on the device network representation.

13. A method of creating a representation of a device network having coprocessors, the method comprising:
probing physical interfaces to identify coprocessors;
loading device drivers corresponding to the coprocessors;
obtaining attributes of the coprocessors; and
creating a device network representation based on the device drivers and attributes of the coprocessors.

14. A method as in claim 13 wherein the representation of the device network includes any of a number and type of coprocessors in the network, a number and type of central processing units in the network, types of memory in the network, and memory available in central processing units or coprocessors of the network.

15. A system for executing coprocessor-unaware computer code on coprocessors, the system comprising:
a device network having coprocessors;
source code written in coprocessor-unaware computer code; and
a coprocessor-aware computer code generation program configured to (i) parse the source code to generate intermediate code, (ii) analyze the intermediate code to determine a model for coprocessor-aware computer code generation, (iii) generate coprocessor-aware computer code based on the model using machine learning; and (iv) execute the coprocessor-aware computer code using the coprocessors.

16. A system as in claim 15 wherein the coprocessor-unaware computer code includes non-parallel computer code, and wherein the coprocessor-aware computer code includes parallel thread safe and scalable computer code.

17. A system as in claim 15 wherein the coprocessor-aware computer code generation program generates coprocessor-aware computer code using a neural network.

18. A system as in claim 17 wherein the neural network is trained using samples of intermediate code and corresponding coprocessor-aware computer code.

19. A system as in claim 15 wherein the coprocessors are any of graphic processing units, field programmable gate arrays, accelerated processing units, and security layer processors.

20. A system as in claim 15 wherein the coprocessor-unaware computer code type is any of Matlab, Julia, Python, C, and Fortran programming languages, and wherein the coprocessor-aware computer code type is an OpenCL programming language.

21. A system as in claim 15 wherein the coprocessor-aware computer code generation program determines a model for coprocessor-aware computer code generation based on training data including samples of intermediate code and corresponding models.

22. A system as in claim 15 wherein the coprocessor-aware computer code generation program determines a numerical method for the intermediate code and generates the coprocessor-aware computer code based on the numerical method.

23. A system as in claim 15 further comprising:
physical interfaces to the coprocessors;
an elastic database; and
a coprocessor discovery program configured to (i) probe the physical interfaces to identify the coprocessors, (ii) load, from the elastic database, device drivers corresponding to the coprocessors, (iii) obtain attributes of the coprocessors, and (iv) create a device network representation based on the device drivers and attributes of the coprocessors.

24. A system as in claim 23 wherein the coprocessor-aware computer code generation program generates the coprocessor-aware computer code based on the device network representation.

25. A machine readable storage medium having stored thereon a computer program for enabling execution of coprocessor-unaware computer code on coprocessors, the computer program comprising a routine of set instructions for causing the machine to:
parse coprocessor-unaware computer code to generate intermediate code;
analyze the intermediate code to determine a model for coprocessor-aware computer code generation; and
generate coprocessor-aware computer code based on the model and using machine learning; and
compile the coprocessor-aware computer code and execute the complied code.

* * * * *